Dec. 8, 1925.  1,564,926
J. J. ARMSTRONG ET AL
SCREW CONVEYER
Filed Oct. 30, 1923    2 Sheets-Sheet 1
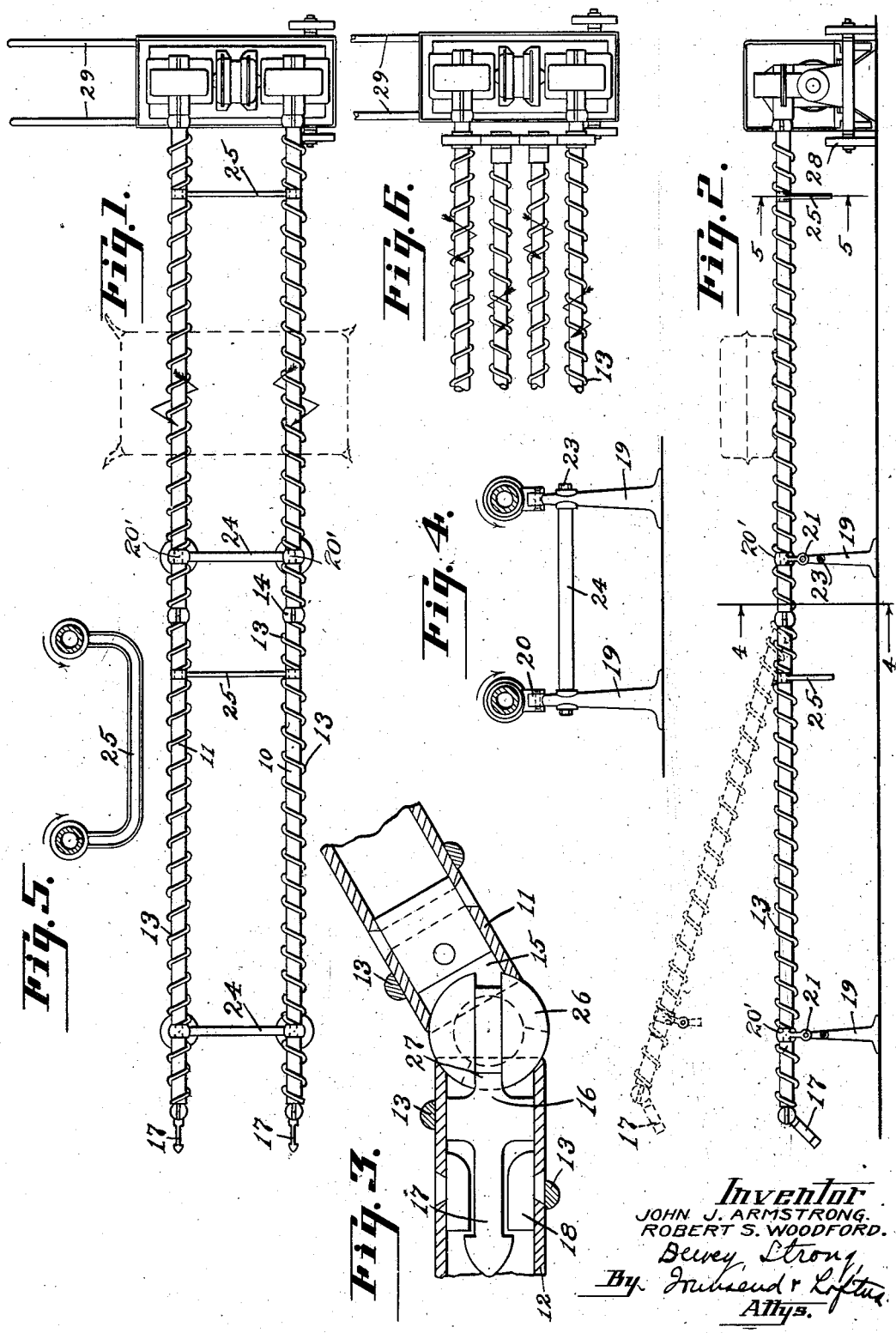
Inventor
JOHN J. ARMSTRONG.
ROBERT S. WOODFORD.
By Dewey, Strong, Townsend & Loftus
Attys.

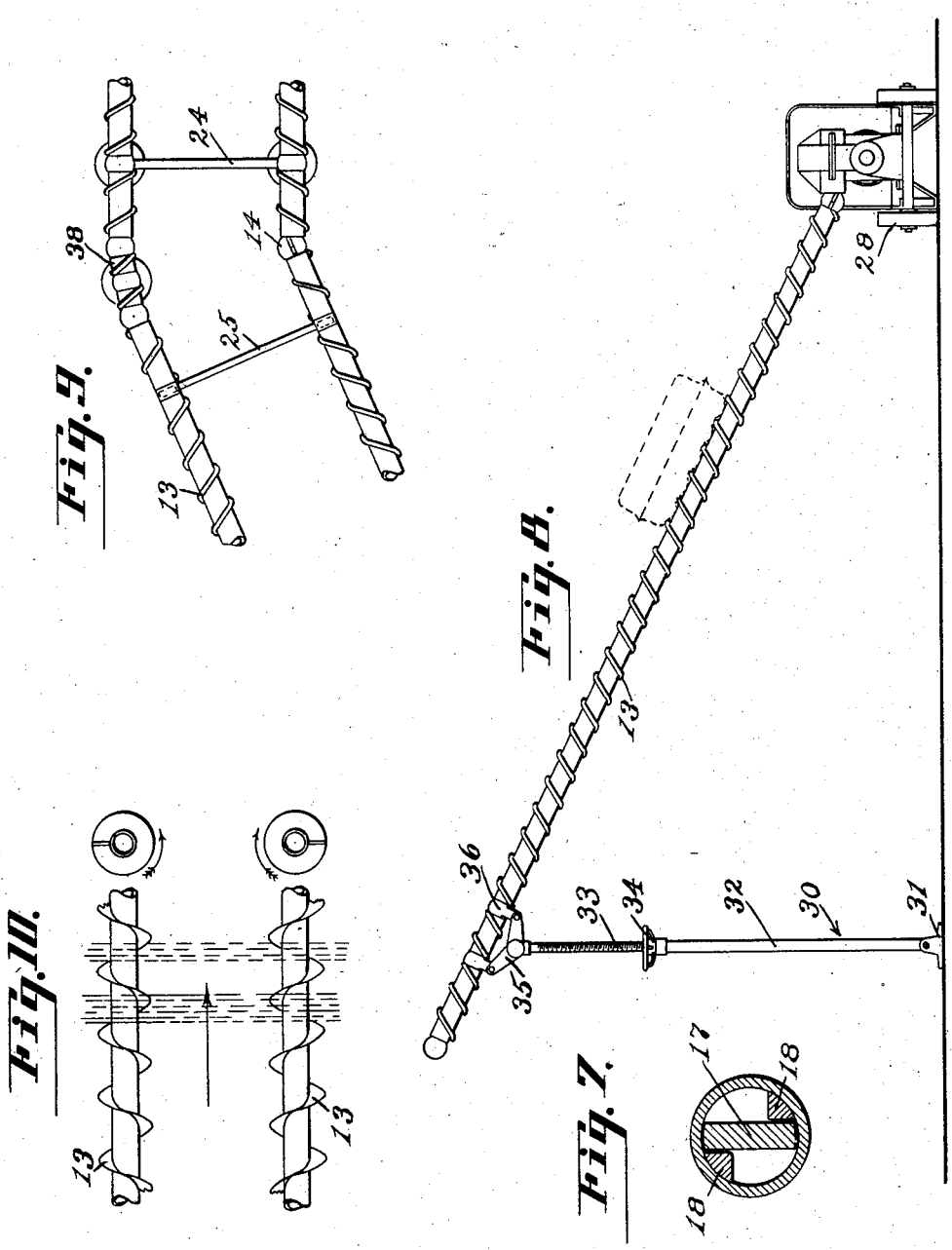

Patented Dec. 8, 1925.

1,564,926

UNITED STATES PATENT OFFICE.

JOHN J. ARMSTRONG AND ROBERT S. WOODFORD, OF CROCKETT, CALIFORNIA.

SCREW CONVEYER.

Application filed October 30, 1923. Serial No. 671,657.

*To all whom it may concern:*

Be it known that we, JOHN J. ARMSTRONG and ROBERT S. WOODFORD, citizens of the United States, residing at Crockett, county of Contra Costa, and State of California, have invented new and useful Improvements in Screw Conveyers, of which the following is a specification.

This invention relates to a conveyer, and particularly pertains to a screw conveyer for transporting sacks, packages, and the like from place to place, and for piling the same.

It is the principal object of the present invention to provide a conveyer which is especially adapted for conveniently and rapidly transporting packages from place to place, as, for example, sacks of bulk material, barrels and boxes, loose sticks such as sugar cane, lath, etc.

The present invention contemplates the use of a pair of screw conveying members, the threads of which cooperate to hold the package in a conveying position while resting thereon and to simultaneously advance the package along the conveyer.

The invention is illustrated by way of example in the accompanying drawings, in which:

Fig. 1 is a view in plan showning one form of the present invention.

Fig. 2 is a view in side elevation showing the conveying mechanism and indicating in dotted lines its angular adjustment.

Fig. 3 is an enlarged fragmentary view in section and elevation showing one of the joints of the conveying mechanism.

Fig. 4 is a view in vertical section through the structure as seen on the lines 4—4 of Fig. 2.

Fig. 5 is a view in vertical section through the structure as seen on line 5—5 of Fig. 2, and showing the spacing means for maintaining the conveyer elements in parallelism.

Fig. 6 is a fragmentary view in plan showing another form of the present invention.

Fig. 7 is an enlarged view in transverse section through one of the conveyers, showing the manner in which a tongue 17 and the lugs 18 interlock.

Fig. 8 is a view in side elevation showing one method of supporting the conveyers to cause them to carry an article up an incline, as when piling material.

Fig. 9 is a fragmentary view in plan showing an adaptation of the conveyer structure when it is desired to turn corners in the course of transit.

Fig. 10 is a fragmentary view showing end and plan elevations of a pair of conveyers used particularly for carrying sticks, and the like, such, for example, as sugar cane.

Referring more particularly to the drawings, 10 and 11 indicate two parallel conveying units. These units each comprise shafts 12 around which a helical thread 13 is formed or wound. The shafts 12 may, for the sake of convenience, be made of tubular material if desired. In some instances it may be desirable to convey material along paths deviating from the horizontal or vertical plane of the first portion of the conveyer, and for that reason the shafts 12 may be made in suitable lengths connected by universal joints 14. These joints, as shown in Fig 3, comprise a member 15 fastened into the end of shaft 11 and universally connected to a member 16. This joint member is formed with a tongue 17 extending into a socket 18 of a complementary section of shaft 12. In this manner it is possible to readily assemble a set of conveyers for a specific purpose, it being understood that the tongue 17 is flattened so that rotary motion can be imparted to all of the connected shafts simultaneously. The screw thread 13 projects from the cylindrical face of the shaft 12 and as indicated in Fig. 3 may be of semi-circular section, although threads of other sections may be used if desired. Attention is directed to the fact that the threads on shafts 10 and 11 are right hand and left hand. This is of particular importance in the present case for the two screws will thus act to balance the package resting upon them and will insure that the package may be carried along the two screws without the use of side guides; as for example, a sack of sugar may be thrown across the conveyers 10 and 11 and the sack will thus become indented by the portion of the threads upon which it rests. The two screws will then act to advance the sack while the indented portion is acting as a nut for the thread 13, and as the threads of the two shafts 10 and 11 are rotated in opposite directions any tendency for the sack to move transversely of the conveying mechanism will be overcome. The shafts 12 may be supported by standards 19 having yoke portions 20 which fit between shoulders formed by reducing the diameter of the shaft for a short length as indicated at 20'. This prevents the shafts from moving longitudinally while permitting them to be held for free rotation. The standards 19 are here shown as carrying the yokes 20 at their upper ends upon pivots 21. This will permit the yokes to swing in vertical planes when it is desired to dispose the conveyer elements at an angle to the horizontal. As shown in the drawings, but one pair of standards 19 is provided for each section of conveyer, these standards being fastened together by a bolt 23 and held in spaced relation by an intervening spacer pipe 24. The standards are mounted near one end of a conveyer length while near the other end a spacer yoke 25 is provided. This yoke is formed with bearings through which the conveyer sections extend and within which they may rotate. By this means the conveyer sections will be held in spaced relation to each other when assembled, and more particularly when unassembled, thus relieving twist and strain on the bearings.

The universal joint mechanism shown in Fig. 3 comprises the member 15 fitted into the shaft 11 and a member 16 fitted into the shaft 12. The member 16 is formed with the tongue 17. The end of this tongue is designed with an enlarged head, thus insuring that after the tongue has passed into the end of the tube and has been partially rotated it will lock itself behind the lugs 18 carried within the tube. The member 15 is formed with a U-shaped end portion indicated in dotted lines which is positioned within an annular groove of a pivot ball 26. Another similar groove as indicated at 27 extends around the ball at right angles thereto and receives the U-shaped end of the member 16. The portions of the ball embraced by the U-shaped ends of the members 15 and 16 are spheroidal in shape and thus permit a universal drive action from one of the sections to the other.

In the form of the invention shown in Fig. 6 it will be seen that a plurality of conveyers is provided. The right and left hand conveyers are, however, equal in number so that the article resting upon them and being conveyed therealong will move longitudinally of the conveyers without being thrown off at one side due to the rotation of the members.

It will be readily recognized that the present invention is suitable for portable installations. For this reason the driving mechanism may be conveniently mounted on a running gear embodying wheels 28 moved from place to place by handles 29. The standards may also be rendered portable if they are of light construction, as, for example, the pipes shown in the drawing.

In operation of the present invention the conveyer structure is set up to convey articles to a desired point, after which the driving mechanism is set in motion. This will cause the two conveyer shafts to rotate in counter directions. Articles may then be deposited on the two shafts and frictional engagement of the outer surfaces of the shafts and the right and left hand threads will cause the article to move forwardly along the shafts as the shafts rotate at the same rates of speed.

It will thus be seen that by the present invention a simple, efficient conveyer of a portable or stationary type is provided which will insure that packages including filled sacks and barrels may be rapidly transported from place to place.

The present device is especially suited for handling loose sticks, rods, etc., such as sugar cane, laths, and the like. In this case it is desirable to provide conveyers with flights as shown in Fig. 10. When piling material it is preferable to support the conveying means by the adjustable pedestals 30 indicated in Fig. 8. Here it will be seen that these pedestals comprise a foot 31 to which a tubular member 32 is pivotally secured. This member receives the end of screw 33, which may be telescoped within the member 32 by operation of a nut 34. Suitable fastening means 35 carry bearings 36 by which the conveyers are rotatably supported.

In the form of invention shown in Fig. 9 the filler section 38 is interposed between separated ends of conveyer units. This makes it possible for the conveyers to carry articles along a curved path of travel.

While we have shown the preferred form of our invention as now known to us, it will be understood that various changes might be made in the combination, construction and arrangement of parts by those skilled in the art, without departing from the spirit of the invention as claimed.

Having thus described our invention, what we claim and desire to secure by Letters Patent is:

1. A conveyer structure comprising a pair of rotary units disposed parallel to each other, each of said units consisting of a plurality of shafts positioned end to end, universal joints connecting the contiguous ends of the shafts in each unit, and a helical thread formed on the shafts of each unit, the threads of one set of shafts being opposed to the threads of the other set of shafts, and means for simultaneously driving the two sets of shafts in opposite directions.

2. A conveyer structure comprising a pair of complementary conveying devices each comprising a plurality of screw conveyers disposed end to end and articulately connected.

3. A conveyer structure comprising a pair of complementary conveying devices each comprising a plurality of screw conveyers disposed end to end and articulately connected, the threads of the conveyers on the two devices being rotated in opposite directions and being opposite handed.

4. A conveyer structure comprising a pair of complementary conveying devices each comprising a plurality of screw conveyers disposed end to end and articulately connected, and means for detachably securing the sections of the devices in their articulate connection.

5. A conveyer comprising pairs of right and left handed parallel screw conveyers, the conveyers being interrupted at intervals throughout their lengths by universal joints, and means for detachably securing the lengths of conveyers to the universal joints.

6. A conveyer comprising pairs of right and left handed conveying screws arranged in parallelism, said screws being in sections disposed in longitudinal alignment, detachable connections between the contiguous ends of said sections, a bearing member for supporting one end of said sections, and holding the said sections in spaced relation to each other, and a spacing yoke engaging the opposite ends of said sections and holding them in spaced relation to each other.

7. A portable conveying device comprising a portable driving unit, a pair of right and left handed parallel conveying screws driven in opposite directions by said unit, and portable bearing and supporting means for maintaining the screws in driving relation to the unit.

8. A portable conveying device comprising a portable driving unit, pairs of right and left handed parallel conveying screws driven in opposite directions by said unit and articulately connected whereby one pair can be adjusted angularly relative to an adjacent pair to convey material in other than a straight path, and a portable operating and supporting means for maintaining the screws in driving relation to the unit.

9. A portable conveying device comprising a portable driving unit, a pair of right and left handed parallel conveying screws driven in opposite directions by said unit, bearing and supporting means for maintaining the screws in driving relation to the unit, and adjustable supporting means for the screws whereby they will be disposed at an incline.

10. A portable conveying device comprising a portable driving unit, pairs of right and left handed parallel conveying screws driven in opposite directions by said unit, bearing and supporting means for maintaining the screws in driving relation to the unit, and filler units adapted to be interposed between adjacent ends of screws for forming an angular trackway.

11. A portable conveying structure comprising a plurality of pairs of parallel shafts, each pair being disposed in spaced relation to each other and across which and by which separate articles to be conveyed are supported, helical threads formed on the outer surfaces of said shafts with their angles opposite, bearing yokes permanently holding the said shafts in spaced relation to each other and rotatably supporting the same, and separable universal joint members connecting the adjacent ends of parts of shafts whereby the shafts will rotate in unison, and means for simultaneously driving the shafts in opposite directions.

JOHN J. ARMSTRONG.
ROBERT S. WOODFORD.